Patented Nov. 5, 1929

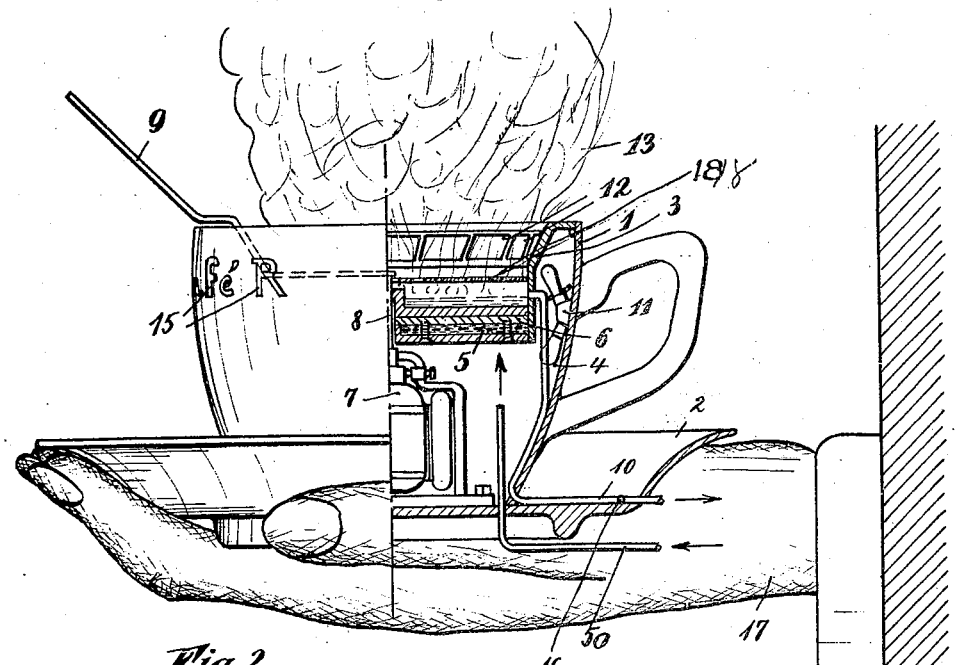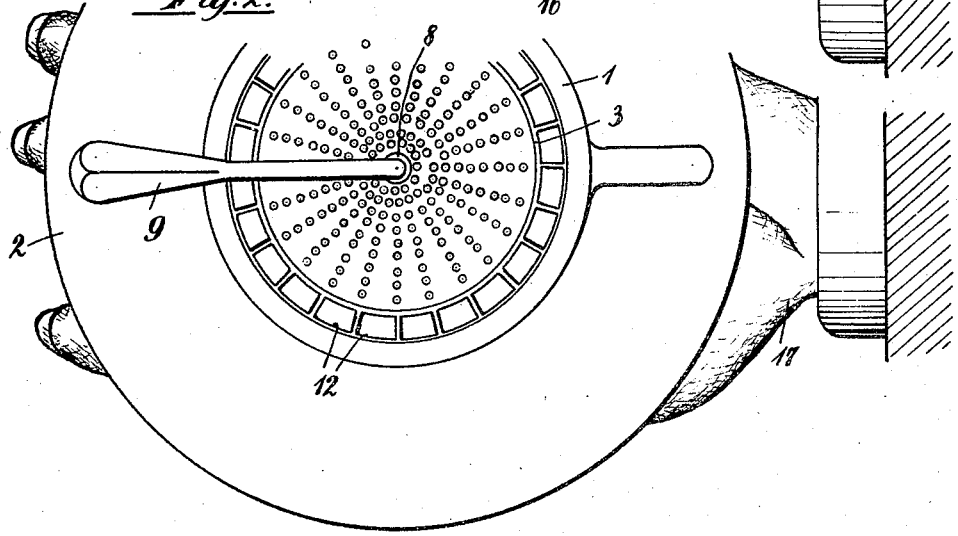

1,734,264

UNITED STATES PATENT OFFICE

FRIEDRICH MARBY, OF STUTTGART, GERMANY

APPARATUS FOR ANIMATED ADVERTISEMENTS

Application filed March 8, 1928, Serial No. 260,189, and in Germany September 26, 1927.

The imitations of animated articles commonly used for illuminated advertising produce, notwithstanding the illumination, only an imperfect and indifferent effect as they lack the naturalness and characteristic properties of the articles which are being advertised. The power of attraction lasts consequently only a very short time as an advertisement must be conspicuous.

This invention has for its object, to improve the representation of living beings and of animated articles of any kind for illuminated advertising as figures, and in plastic or in surface representation, so that it attracts lastingly and effectively the attention of the public.

The arrangement according to the invention is characterized in that the imitated article produces at the same time the attendant phenomena and peculiarities of the article.

An advertisement, according to the invention, representing a cup of coffee, imitates also the rising of steam and for instance the stirring of the coffee with a spoon.

By this form of construction of the advertising figures in combination with light-effect, a very efficient advertisement is obtained, having a long lasting effect on the public, so that the purpose of the advertisement is perfectly and completely attained. With the aid of the advertising arrangement, according to the invention an effective advertising can be obtained also for articles for which hitherto only an imperfect effect could be obtained by means of the commonly used illuminated advertising.

An embodiment of the invention is illustrated, by way of example, in the accompanying drawing, in which:—

Fig. 1 shows, one half in elevation and one half in section, structure imitating a cup filled with steaming hot coffee.

Fig. 2 is a top-plan-view of Fig. 1.

The advertisement shown consists for instance of a coffee cup 1 with saucer 2 held on a support 17 imitating an outstretched hand. This advertisement is useful for coffee-stores, coffee-stalls, groceries, eating houses and the like.

The cup 1 and the saucer 2 are of any desired shape and of any desired material. In the cup 1 a vessel 3 is mounted, a compartment 6 of which is filled with water. An electric heating body 5 under the bottom of the compartment 6, serves to boil the water so that steam is produced. The compartment 6 is covered by a perforated plate 18. A pipe 50 serves for supplying water to the compartment 6, the water in excess flowing out through the discharge-pipe 10. In the hollow space between the wall of the cup 1 and the wall of the vessel 3 incandescent electric lamps 11 are arranged. In this outwardly inclined upper portion of the wall of vessel 3 windows 12 with glass-panes are arranged through which the rising steam can be seen lighted from below by the lamps 11. A translucent advertising inscription 15 extends around the upper portion of the cup 1, this inscription being also lighted by the lamps 11. The outer surface of the cup 1 might be lighted by incandescent electric lamps arranged in the saucer 2. In the discharge-pipe 10 at the lowest point of the saucer 2 a second inlet hole 16 is arranged through which rainwater, which might have collected in the saucer, flows into said discharge-pipe. In the cup 1 a spoon 9 is mounted which is moved directly or through the intermediary of a transmission-gear from the shaft 8 of an electromotor 7 mounted in the lower portion of the cup so that the effect is increased considerably.

I claim:—

1. An apparatus for animated advertisements, comprising in combination with a wall bracket in the form of an outstretched hand, a structure imitating a saucer and a cup fixed on said wall bracket, a translucent advertising inscription extending around the upper portion of said cup, a vessel partly filled with water in the cup having an outwardly inclined rim with apertures closed by glass panes, an incandescent heating body on the bottom of said vessel, a perforated plate in said vessel above the water level at the lower end of said outwardly inclined rim, incandescent lamps in said cup underneath said outwardly inclined rim to light through said glass panes the steam rising from the water in said vessel, a pipe for supplying water to said vessel, a discharge pipe for the water in excess from said vessel, and electric lamps in said saucer for lighting the outer surface of said cup.

2. In an apparatus for animated advertisements as specified in claim 1, in combination with the cup, an electromotor on the bottom of said cup, and a spoon loosely mounted in said cup and moved from said electromotor to imitate stirring.

In testimony whereof I affix my signature.

FRIEDRICH MARBY.